United States Patent
Miyakawa et al.

[11] 3,886,571
[45] May 27, 1975

[54] ELECTRIC SHUTTER CONTROLS FOR CAMERAS

[75] Inventors: Seinan Miyakawa, Tokyo; Hisao Tanaka, Fukuoka-Machi, both of Japan

[73] Assignee: Asahi Kogaku Kogyo Kabushiki Kaisha, Japan

[22] Filed: Mar. 5, 1974

[21] Appl. No.: 448,217

[52] U.S. Cl. .................. 354/234; 354/50; 354/267
[51] Int. Cl. ......................... G03b 7/08; G03b 9/62
[58] Field of Search ............ 354/29, 30, 50, 51, 60, 354/234, 235, 258, 267

[56] References Cited
UNITED STATES PATENTS

| | | | |
|---|---|---|---|
| 3,557,677 | 1/1971 | Schubert | 354/258 X |
| 3,744,385 | 7/1973 | Burgarella et al. | 354/51 |
| 3,791,278 | 2/1974 | Biber et al. | 354/235 |

*Primary Examiner*—Samuel S. Matthews
*Assistant Examiner*—James LaBarre
*Attorney, Agent, or Firm*—Steinberg & Blake

[57] ABSTRACT

A control circuit for a camera shutter which is activated by the operation of a shutter release mechanism of the camera. An electromagnet is utilized for closing the shutter at the end of the exposure time. An energizing circuit is electrically connected to the electromagnet and includes a mechanical switch which is operative in response to the shutter release operation for establishing a first exposure time of a relative short duration. A switching circuit also electrically connected to the electromagnet automatically determines a second exposure time in accordance with certain exposure determining factors. The energizing circuit and the switching circuit respectively contain forward-biased diodes for establishing separate automatic time control of the electromagnet by both the energizing circuit and the switching circuit.

14 Claims, 4 Drawing Figures

ELECTRIC SHUTTER CONTROLS FOR CAMERAS

BACKGROUND OF THE INVENTION

The present invention relates to cameras.

In particular, the present invention relates to an electric control circuit for a camera shutter which permits attaining extremely short exposure times.

In conventional cameras, it is generally very difficult to achieve very high speed shutter operation to achieve exposure times such as 1/1000th or 1/2000th second. It is basically for this reason that heretofore it has not been possible to mass produce cameras having a high speed exposure time focal plane shutter. Those cameras which do possess high speed shutter mechanisms generally require high speed cams having extremely complicated configurations in conjunction with slow governor devices which can limit the speed. These devices are usually provided with a gear mechanism which has to be constructed with extremely high precision and require a complicated adjusting mechanism. In cameras equipped with electric shutters it has also been found difficult to achieve extremely high speed exposure times because of the electrical characteristics of various components utilized in the electronic circuitry for converting the amount of light received on a photosensitive element and also because of the electrical characteristics of various components utilized in the timing circuitry.

SUMMARY OF THE INVENTION

It is accordingly a primary object of the present invention to provide a control circuit for a camera shutter which can readily attain a fast exposure time under ordinary photographic conditions while avoiding the above drawbacks.

In particular it is an object of the present invention to provide an electric shutter control for a camera utilizing a high speed cam mechanism in conjunction with an electric circuit whereby the electric shutter can be set to an arbitrary exposure time of very high speed irrespective of the photographing conditions.

According to the invention, a control circuit is provided for a camera shutter which is activated by the operation of a shutter release mechanism on the camera. An electromagnetic means is utilized for closing the shutter to terminate an exposure. An energizing circuit means is electrically connected to the electromagnetic means and includes a mechanical switch means which is operative in response to the shutter release operation and establishes a first exposure time of a relatively short duration. A switching circuit means is electrically connected to the electromagnetic means for automatically determining a second exposure time in accordance with exposure determining factors. The energizing circuit means and the switching circuit means are each provided with a forward-biased diode means for establishing separate and automatic timed control of the electromagnetic means by both the energizing circuit means and the switching circuit means.

In a particular embodiment of the invention the mechanical switch means includes a high speed cam means whose rotation is initiated by the operation of a shutter release rod coupled to the camera and a cam follower comprising first and second levers held in contacting relationship by a biasing means. The first lever of the cam follower engages the cam during the rotation thereof. The second lever commences rotation together with the first lever and after a predetermined time delay is prevented from further movement by a stopping means whereby contact between the first and second levers is broken thereby opening the switch. An adjusting means is available between the first and second levers for adjusting the time delay from the commencement of movement of the cam until the separation of contact between the two levers.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
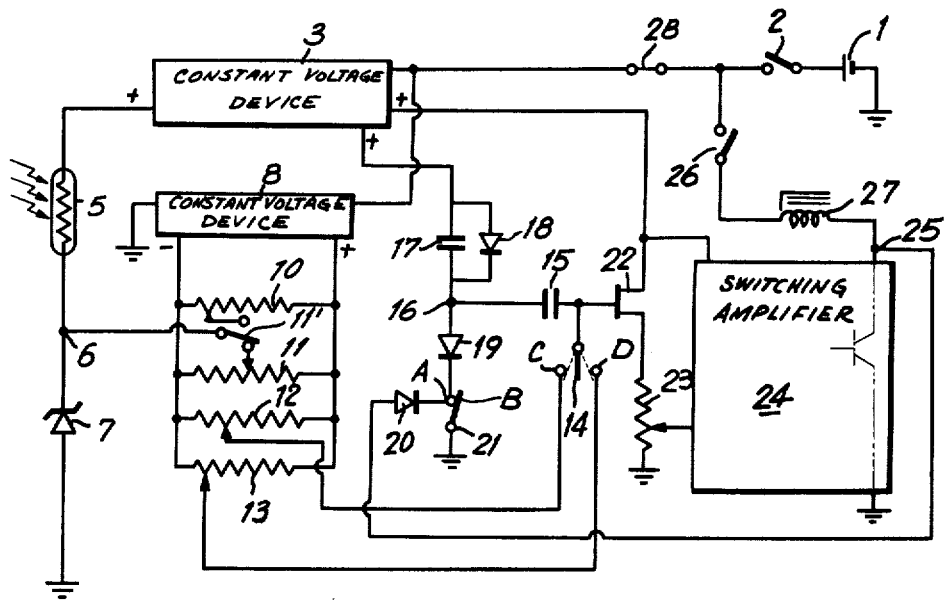
FIG. 1 is a circuit diagram of one possible embodiment of a structure according to the invention.

Referring now to FIG. 1 there is shown a circuit diagram of one embodiment of the present invention wherein a power source 1, shown as a battery for energizing the circuit arrangement, is applied to the circuit by means of main power switch 2, closed in a known way during the initial part of the depression of a shutter-tripping plunger. Upon closure of the main power switch 2, constant voltage devices 3 and 8 are energized through a normally-closed switch 28 which is capable of being manually opened by any suitable control accessible to the operator. The constant voltage device 3 provides a constant voltage to the logarithmic compression circuit comprising the light-receiving photoelectric conversion element 5 connected in series with a diode 7. The other side of the diode is connected to ground. The constant voltage device 3 also provides voltage to a timing circuit including timing capacitor 17 in parallel with diode 18. The parallel combination of the timing capacitor 17 and diode 18 is serially connected at point 16 with the series combination of forward-biased diode 19 and a timing switch 21 which is connected to ground. The constant voltage source 3 also supplies a voltage to a high input impedance transistor 22, such as a field effect transistor, whose output circuit is connected through the potentiometer 23 to ground. Memory capacitor 15 is interconnected between terminal point 16 and the control lead of the transistor 22, as for example the gate of the field effect transistor.

The constant voltage device 8 energizes the control circuitry for the various exposure determining factors including various camera settings. This circuitry includes a lens diaphragm value substitution circuit 10 for manual control of the lens diaphragm setting. For full aperture light measurement utilizing automatic control there is provided the additional lens diaphragm value substitution circuit 11. Switch 11' is provided for switching into the circuit the manual control of resistor 10 or the automatic control of resistor 11. Terminal 6 interconnecting the photoelectric element 5 and the diode 7 of the logarithmic compression circuit is connected to the swith 11'. The exposure setting circuitry also includes a film sensitivity value substitution circuit 12 wherein the factor of the film speed can be introduced in order to contribute to the proper determination of the exposure time. The exposure circuitry also provides for complete manual control of the exposure time regardless of the automatic exposure time control. For this purpose the substitution circuit 13 is available, so that the desired exposure time can be manually set.

Electromagnet 27 is provided for closing the shutter to terminate an exposure. Thus, by way of example, when the shutter release mechanism in the camera is operated to commence the exposure, a leading shutter curtain runs down, thereby opening the shutter. The trailing shutter curtain will be held by the electromagnet 27. Usually the electromagnet is in an energized state while holding up the trailing shutter curtain. When the electromagnet is de-energized, the trailing shutter curtain will be released and will run down to close the shutter, thereby completing the exposure.

In FIG. 1, there are two circuits available for energizing the electromagnet 27. A first energizing circuit includes switch 26 connected through the electromagnet 27 and terminal 25 to a forward-biased diode 20 which is connected to contact A of switch 21, the other contact B of which is connected to ground. Switch 26 is closed in respect to depression of the shutter plunger after switch 2 is closed. When switch 26 is in a closed position and switch 21 is closed, the electromagnet 27 will be energized by this energizing circuit. Additionally, there is provided a switching circuit which also can energize the electromagnet 27. The switching circuit includes the switching amplifier 24 which is of a type well known in the art and is shown by way of a block having therein a schematic drawing of a transistor to indicate that the switching amplifier 24 would typically include at least one and frequently more switching transistors. The switching amplifier is controlled through the potentiometer 23 by means of the timing circuit and memory capacitor 15 whereby the switching circuit provides an automatic control of the electromagnet 27 based upon exposure determining factors detected in the logarithmic compression circuit as well as the exposure settings entered on the various circuits 10, 11, 12 and 13.

The operation of the circuit shown in FIG. 1 will now be described. The energizing circuit includes the forward-biased diode 20. Similarly, the switching circuit utilizing the switching amplifier 24 and the timing circuitry includes a forward-biased diode 19. The energizing circuit including forward-biased diode 20 is utilized to provide an extremely fast shutter speed operation as will hereinafter be explained. The switching circuit utilizing the forward-biased diode 19 is used to provide the automatic exposure time in accordance with detected and preset exposure determining factors. The two circuits work in conjunction so that the minimum time duration of the exposure will be determined by the energizing circuit providing the extremely fast shutter speed. Slower speeds will be provided by the switching circuit. Thus, by way of example, if the energizing circuit including the forward-biased diode 20 is set for a speed of 1/2000th second, should the automatic switching circuit provide a shorter time duration, the energizing circuit will control and the exposure time will be 1/2000th second despite the fact that the automatic switching circuit provides a shorter time. However, should the automatic switching circuit provide a slower speed, it will control and determine the exposure time in a manner similar to ordinary electric shutters.

The automatic switching circuit operates as follows:

With the main power switch 2 closed, and with the switch 26 closed to energize the electromagnet, in order to utilize the automatic switching circuit it is necessary that the switch 28 be in its normally closed position. The constant voltage devices 3 and 8 will then energize the various parts of the switching circuit. Specifically, the logarithmic compression circuit will be activated and the photoelectric conversion element 5 will respond to the amount of light received by the camera. The various exposure determining factors, such as diaphragm opening and film sensitivity will aso be utilized in determining an electrical quantity representing the proper exposure time which will then be transmitted to the memory capacitor 15. This electrical quantity is stored as a voltage. Transistor 22 will remain in a non-conductive state and the switching amplifier 24 will remain conductive thereby energizing the electromagnet 27. The timing capacitor 17 is charged by the constant voltage device 3. When the timing switch 21 is moved from position A to position B, the timing capacitor 17 will discharge thereby increasing the voltage at the gate of transistor 22 until such time as the transistor 22 will be turned on thereby causing the switching amplifier 24 to become non-conductive whereby the electromagnet 27 will be deenergized to release the trailing curtain and terminate the exposure. The exposure time will depend upon the voltage memorized by the memory capacitor 15, which in turn depends upon the exposure determining factors from the photoelectric element 5 and the exposure settings on the circuits 10, 11, 12 and 13. Switch 14 is additionally provided to utilize a complete automatic exposure time control when in position C, whereby the effect of the manual substitution circuit 13 is ineffective. When switch 14 is placed at contact D, the electric shutter circuit operates at the shutter speed which has been set by the manual exposure time substitution circuit 13. During actual shutter operation, the switch 14 is held in position D.

The energizing circuit providing the high speed shutter exposure time operates as follows. When switches 26 and 28 are closed, the electromagnet 27 is energized by the energization and switching circuits until such time as the switch 21 moves from position A to position B. This time delay leads to a very fast shutter speed as desired by means of a mechanical cam. When the switch 21 is in its position A during operation of the energizing circuit, the transistor 22 will not operate. Thus, under conditions where the shutter speed provided by the automatic switching circuit is a faster speed than the preselected fastest shutter speed provided by the energizing circuit, the automatic shutter speed will not be utilized but the preselected fastest shutter speed will control the deenergizing of the electromagnet 27. On the other hand, under conditions where the shutter speed automatically provided by the automatic switching circuit is at a slower speed than the preselected fastest shutter speed provided by the energizing circuit, the slower speed will be utilized since upon opening of the switch 21 to position B the switching amplifier will hold the electromagnet 27 energized until the automatic exposure time has been achieved and the transistor 22 becomes conductive.

Figure 2A:
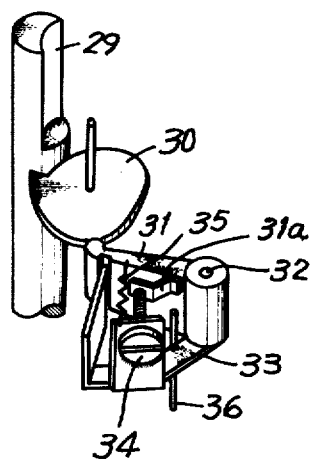
FIGS. 2a and 2b are respectively schematic perspective and plan views of one embodiment of a mechanical timing switch for use in the present invention.
Figure 2B:
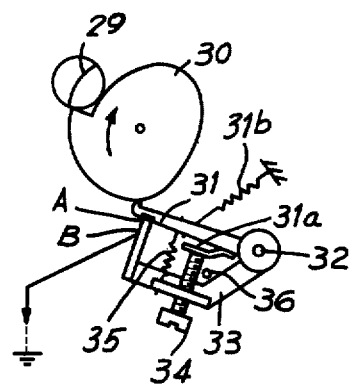

The control of the switch 21 to provide the fastest shutter speed will not be described with reference to FIGS. 2a and 2b. Prior to commencement of a shutter release operation, the switches 2 and 26 are closed. If only the fastest shutter speed is desired, however, switch 28 is manually opened. Under these conditions, the electromagnet is energized through the energizing circuit and the shutter mechanism, which has previously been cocked by the film winding operation, is now ready for the next operation. Specifically, the trailing shutter curtain is held by the energized electromagnet 27 and the leading shutter curtain is connected at its drive shaft (not shown) to a high speed cam 30 seeking to rotate the latter in a clockwise direction as viewed in FIGS. 2a and 2b. The high speed cam 30 is prevented from rotating, however, by engagement with the surface of the shutter release rod 29. When the shutter release rod 29 is depressed, the recessed portion in the upper end thereof lowers until the high speed cam 30 is disengaged from the rod 29 and rotates in a clockwise direction as viewed in FIGS. 2a and 2b. Simultaneously the leading shutter curtain runs down to open the shutter. At the same time, a cam follower including lever 31 remains in contact with the peripheral camming surface of cam 30. A second lever 33 is pivotally arranged about the pivot 32 with the first lever 31 and is held in engaging contact therewith by means of the biasing spring 35 so that as the cam 30 rotates the first and second levers 31 and 33 are pivoted in a clockwise direction about the common shaft 32, for example by a spring 31b acting on lever 31 to maintain it in contact with cam 30. The first lever 31 continues to swing and follow the movement of the cam surface of the high speed cam 30 until the cam stops. The second lever 33 however continues movement along with the first lever 31 only until its movement is stopped by engagement with a stationary stopping pin 36 arranged adjacent to the pivot 32. At this point, the contact between the levers 31 and 33 is broken. In FIG. 2b there is shown the contacts A and B carried by the levers 31 and 33 and engaging each other to close switch 21, as shown in the solid lines illustration in FIG. 1, and spaced from each other when the levers 31 and 33 are disengaged to open switch 21 as shown in dotted lines in FIG. 1. The time delay from the commencement of the movement of the cam until disegagement between the levers 31 and 33 provides the timing switch 21. The time delay can be adjusted to obtain the desired fast shutter speed. The adjustment is effected by means of a leaf spring 31a arranged on the first lever 31 in conjunction with an adjusting screw 34 arranged on the second lever 33. The adjusting screw 34 is so arranged as to provide a pressing engagement with the leaf spring 31a thereby urging the first and second levers 31 and 33 in a direction away from each other. The tip of lever 33, forming contact B, is slidably received in a notch of contact A. Screw 34 adjusts the extent to which contact B is received in this notch, thus adjusting the instant when the contacts separate from each other.

Thus, the levers 31 and 33 disengage to provide the movement of switch 21 from position A to position B. At this moment, assuming switch 28 of FIG. 1 has been previously manually opened, the trailing shutter curtain is released by the electromagnet 27 and runs down to terminate the exposure.

Figure 3:
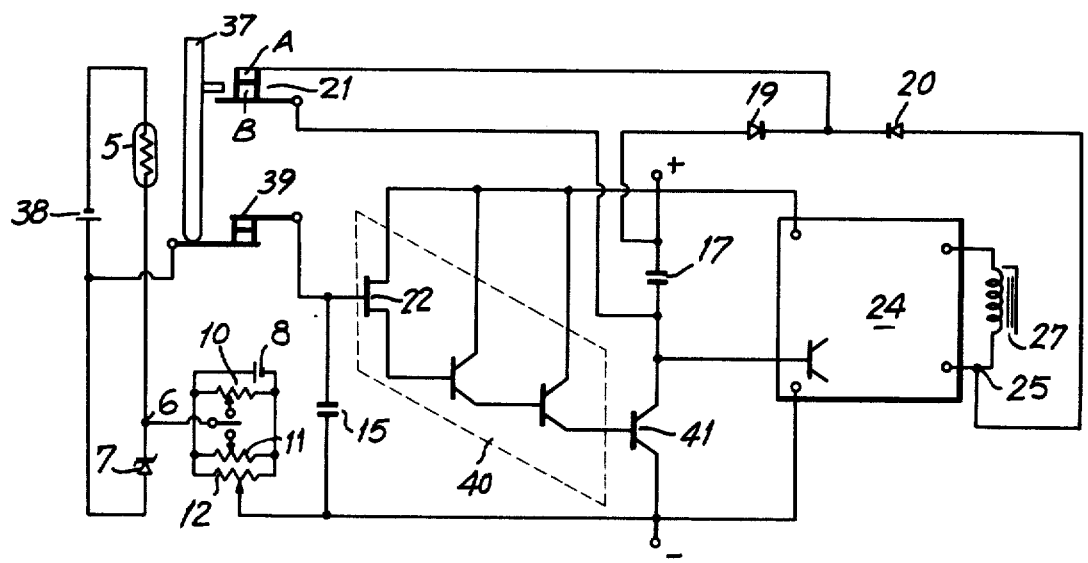
FIG. 3 is a circuit diagram of another possible embodiment of a structure according to the invention.

Referring now to FIG. 3 there is shown another embodiment of a wiring circuit in accordance with this invention. The embodiment shown in FIG. 1 utilizes a timing capacitor wherein the exposure time is determined by the discharging of the timing capacitor 17. In FIG. 3, the timing capacitor 17 is so arranged that the exposure time is determined by the charging of the timing capacitor. Thus, in FIG. 3 the timing capacitor 17 is connected in series with transistor 41, which is utilized for providing the charging of the constant current for the timing capacitor 17. The internal impedance of the transistor 41 is controlled by means of the voltage stored on the memory capacitor 15 and transmitted through the high input impedance transistor 22 and the amplifier circuit 40. The timing capacitor 17 will charge through the transistor 41 and when a sufficient voltage is provided the switching amplifier 24 will de-energize the electromagnet 27.

FIG. 3 also includes a power source battery 38 to provide the energy for the photoelectric conversion element 5 rather than the constant voltage device 3 as shown in FIG. 1. Also shown in FIG. 3 is a memory switch 39 which is operative in conjunction with the depression of a release rod 37 corresponding to rod 29 and used to activate the switch 21 illustrated only schematically in FIG. 3 but having the structure shown in FIGS. 2a and 2b and described above. Remaining circuit portions of FIG. 3 are identical to those in FIG. 1 and have the same numeric identification and also operate in a similar manner.

There has thus been shown a control circuit for a camera shutter which provides a switching circuit for providing automatic exposure time control of the electric shutter. Separately therefrom there is provided an energizing circuit for controlling the energization of the electromagnet in accordance with an adjusted fast shutter speed. A mechanical switch is utilized as part of the energizing circuit which responds to the shutter release operation. The mechanical switch also serves as the timing switch of the switching circuit. In order to provide for the separate and automatic time control of the electromaagnet from both the energizing circuit and the switching circuit, each of the aforementioned circuits include a forward-biased diode for preventing the current flowing in one circuit from influencing the other circuit. In this manner a fast speed can be provided and at the same time conventional automatic shutter control can also be provided.

What is claimed is:

1. In a control circuit for a camera shutter activated by the operation of a shutter release mechanism of the camera, electromagnetic means for closing the shutter to terminate an exposure, energizing circuit means electrically connected to said electromagnetic means and including mechanical switch means operative in response to said shutter release operation for establishing a first exposure time of short duration, switching circuit means electrically interconnected to said electromagnetic means for automatically determining a second exposure time in accordance with exposure determining factors, and a pair of forward-biased diode means connected respectively in said energizing circuit means and said switching circuit means for establishing separate automatic timed control of said electromagnetic means by both said energizing circuit means and said switching circuit means.

2. The combination of claim 1 and wherein said switching circuit means includes a timing switch for commencing the timing of said second exposure time and wherein said timing switch is operated by said mechanical switch means.

3. The combination of claim 1 and wherein said electromagnetic means responds to the longer of said first and second exposure times.

4. The combination of claim 1 and wherein said switching circuit means includes detecting means for determining an electrical quantity representing exposure determining factors, memory means connected to said detecting means for storing said electrical quantity, timing means electrically connected with said memory means for establishing said second exposure time based upon said stored electrical quantity and amplifier switching means interconnecting said timing means and said electromagnetic means for deenergizing said electromagnetic means when said second exposure time is reached.

5. The combination of claim 4 and wherein one of said forward-biased diode means is serially interconnected with said timing means.

6. The combination of claim 4 and wherein said detecting means includes manual circuit means for manually setting a desired exposure time, and memory switch means electrically interconnecting said manual circuit means with said memory means wherein when said memory switch means is actuated, said memory means will store an electrical quantity representative of said desired exposure time from said manual circuit means.

7. The combination of claim 1 and wherein said energizing circuit means includes electrical switch means controlled by said mechanical switch means, one of said forward-biased diode means being serially interconnected with said electrical switch means.

8. The combination of claim 7 and wherein said electrical switch means is serially interconnected with said switching circuit means for providing a timing switch for said switching circuit means.

9. The combination of claim 1 and comprising shutter release rod means coupled onto the camera, high speed cam means capable of rotation, said cam means being restrained by said rod means and being released for rotation upon operation of said rod means, said mechanical switch means including a cam follower means having a first lever in contact engagement with said cam means and a second lever pivotally coupled to said first lever, biasing means arranged between said first and second levers to maintain contact therebetween, for closing said mechanical switch means, and stopping means positioned to limit movement of said second lever, wherein upon operation of said rod means said cam means will rotate, said first lever means will rotate along with said cam means, and said second lever will initially contact said second lever and pivotally rotate therewith for a fixed time interval until said stopping means limits further movement thereof, whereupon the contact between said levers is broken to open said mechanical switch means.

10. The combination of claim 9 and further comprising adjusting means for controlling said time interval.

11. The combination of claim 10 and wherein said adjusting means includes a leaf spring arranged on said first lever and an adjusting screw arranged on said second lever and engaging said leaf spring, wherein said adjusting means urges said first and second levers apart from each other.

12. The combination of claim 1 and further comprising electrical switch means serially connected in said switching circuit means, for deactivating said switching circuit means whereby said electromagnetic means will be controlled only by said energizing circuit means.

13. The combination of claim 1 and wherein said pair of forward-biased diode means are electrically interconnected to each other in reverse-biased arrangement for preventing current from said energizing circuit means and said switching circuit means from affecting each other.

14. The combination of claim 13 and wherein said mechanical switch means forms a timing switch for commencing said second exposure time, said timing switch being electrically connected to the interconnection between said pair of diode means and having its operation controlled by said mechanical switch means.

* * * * *